(12) United States Patent
Chen et al.

(10) Patent No.: US 12,196,183 B2
(45) Date of Patent: Jan. 14, 2025

(54) COOLING CONTROL METHOD AND COOLING CONTROL APPARATUS FOR GENERATOR OF WIND TURBINE

(71) Applicant: BEIJING GOLDWIND SCIENCE & CREATION WINDPOWER EQUIPMENT CO., LTD., Beijing (CN)

(72) Inventors: Liquan Chen, Beijing (CN); Liangnian Lv, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/577,862

(22) PCT Filed: Sep. 29, 2022

(86) PCT No.: PCT/CN2022/122423
§ 371 (c)(1),
(2) Date: Jan. 9, 2024

(87) PCT Pub. No.: WO2023/116112
PCT Pub. Date: Jun. 29, 2023

(65) Prior Publication Data
US 2024/0328395 A1 Oct. 3, 2024

(30) Foreign Application Priority Data
Dec. 24, 2021 (CN) .......................... 202111597027.X (51) Int. Cl.
*F03D 80/60* (2016.01)
*F03D 7/02* (2006.01)

(52) U.S. Cl.
CPC ............. *F03D 80/60* (2016.05); *F03D 7/028* (2013.01); *F05B 2260/20* (2013.01); *F05B 2270/1033* (2013.01)

(58) Field of Classification Search
CPC ................................ F03D 80/60; F03D 7/028
See application file for complete search history.

(56) References Cited

U.S. PATENT DOCUMENTS 8,977,401 B2 * 3/2015 Poulsen .................. F03D 7/044
290/55
2010/0270798 A1 10/2010 Poulsen et al.

FOREIGN PATENT DOCUMENTS

CN 1410669 A 4/2003
CN 201243209 5/2009
(Continued)

OTHER PUBLICATIONS

International Search Report and Written Opinion from related PCT Application No. PCT/CN2022/122423 dated Nov. 25, 2022 (9 pages).

*Primary Examiner* — Brian O Peters
(74) *Attorney, Agent, or Firm* — Bayes PLLC (57) ABSTRACT

The present disclosure provides a cooling control method and a cooling control apparatus for a generator of a wind turbine. A cooling device of the generator and an intermittent operation device are connected to a frequency converter, the frequency converter controls the cooling device and the intermittent operation device to start up at different times, and the cooling control method includes: under a condition that a starting condition of the intermittent operation device is determined to be satisfied, calculating a predicted temperature of the generator; under a condition that the predicted temperature is less than or equal to a predetermined threshold temperature, using the frequency converter to control the intermittent operation device to start up to (Continued)

execute the predetermined related action; and using the frequency converter to control the cooling device to start up to cool the generator.

10 Claims, 5 Drawing Sheets

(56) References Cited

FOREIGN PATENT DOCUMENTS

| | | |
|---|---|---|
| CN | 201918743 U | 8/2011 |
| CN | 106523282 A | 3/2017 |
| CN | 110360064 | 10/2019 |

* cited by examiner

COOLING CONTROL METHOD AND COOLING CONTROL APPARATUS FOR GENERATOR OF WIND TURBINE

CROSS-REFERENCE TO RELATED APPLICATIONS

This application is the national phase of International Application No. PCT/CN2022/122423, filed on Sep. 29, 2022, which claims the priority to Chinese Patent Application No. 202111597027.X, filed on Dec. 24, 2021. The entire contents of each of the above-identified applications are expressly incorporated herein by reference.

TECHNICAL FIELD

The present application generally relates to a technical field of wind power generation, and more particularly to a cooling control method and a cooling control apparatus for a generator of a wind turbine.

BACKGROUND

In the current wind power generation industry, the driving scheme for cooling a generator and the driving scheme for yawing adopted by direct-driving and semi-direct-driving wind turbines may include four scheme combinations. The first scheme combination is that the driving scheme for cooling the generator and the driving scheme for yawing both adopt a mode of directly connecting to a power grid (that is, directly connecting to a distribution transformer (connected to the power grid)); the second scheme combination is that the driving scheme for cooling the generator adopts the mode of directly connecting to the power grid and the driving scheme for yawing adopts a mode of utilizing a frequency converter (that is, connecting to the distribution transformer via the frequency converter); the third scheme combination is that the driving scheme for cooling the generator adopts the mode of utilizing the frequency converter and the driving scheme for yawing adopts the mode of directly connecting to the power grid; the fourth scheme combination is that the driving scheme for cooling the generator and the driving scheme for yawing both adopt the mode of utilizing the frequency converter.

Characteristics of each of the four scheme combinations are as follows: for the first scheme combination, the cost is the lowest, the starting shock is great, the distribution transformer has a large capacity, the yaw trip exists, the self-power consumption is high, and the generator has a great temperature fluctuation; for the second scheme combination, the cost is relatively low, the starting shock is relatively great, the distribution transformer has a relatively large capacity, the self-power consumption is high, and the generator has a great temperature fluctuation; for the third scheme combination, the cost is relatively low, the starting shock is relatively great, the distribution transformer has a relatively large capacity, and the yaw trip exists; for the fourth scheme combination, the cost is relatively high, no starting shock exists, and the distribution transformer has a little capacity.

In summary, it may be concluded that in the existing schemes, the disadvantages of the scheme using the mode of directly connecting to the power grid are as follows: the great starting shock, the large distribution transformer capacity, the high self-power consumption, the great generator temperature fluctuation, and the yaw system tripping failure; and the disadvantage of the scheme using the mode of utilizing the frequency converter is high cost.

SUMMARY

Exemplary embodiments of the present disclosure aim to provide a cooling control method and a cooling control apparatus for a generator of a wind turbine.

According to the exemplary embodiments of the present disclosure, a cooling control method for a generator of a wind turbine is provided, a cooling device of the generator and an intermittent operation device of the wind turbine are connected to a frequency converter, the frequency converter controls the cooling device and the intermittent operation device to start up at different times, and the cooling control method for the generator includes: under a condition that a starting condition of the intermittent operation device is determined to be satisfied according to operation data of the wind turbine, calculating a predicted temperature of the generator after a duration required for using the frequency converter to control the intermittent operation device to start up to execute a predetermined related action; under a condition that the predicted temperature is less than or equal to a predetermined threshold temperature, using the frequency converter to control the intermittent operation device to start up to execute the predetermined related action; and after the intermittent operation device executes the predetermined related action, using the frequency converter to control the cooling device to start up to cool the generator.

According to another exemplary embodiment of the present disclosure, a calculation apparatus is provided, and the calculation apparatus includes a processor and a memory storing a computer program, in which the computer program, when executed by a processor, implements the cooling control method for the generator as described above.

According to another exemplary embodiment of the present disclosure, a wind turbine is provided, in which the wind turbine includes: a frequency converter; a cooling device of a generator; a yaw motor; and the calculation apparatus as described above.

A part of additional aspects and/or advantages of the general concept of the present disclosure will be set forth in the following description, and other part of additional aspects and/or advantages of the general concept of the present disclosure will be obvious from the description, or may be learned by implementation of the general concept of the present disclosure.

BRIEF DESCRIPTION OF DRAWINGS

The above and other purposes and features of exemplary embodiments of the present disclosure will become more apparent by the following description in conjunction with the accompanying drawings showing by way of example the embodiments, in which.

DETAILED DESCRIPTION

Specific implementations are provided below to assist a reader in obtaining a thorough understanding of a method, an apparatus and/or a system described herein. However, various changes, modifications, and equivalents of the method, the apparatus, and/or the system described herein will be apparent after disclosure of the present application is understood. For example, sequences of operations described herein are merely examples, and are not limited to those sequences set forth herein. Further, in addition to operations that must be executed in a particular sequence, the sequences of operations may be changed as what will be apparent after the disclosure of the present application is understood. Moreover, for the sake of clarity and brevity, descriptions of features known in the art may be omitted.

The features described herein may be implemented in various forms and should not be construed as limited to examples described herein. Rather, examples described herein have been provided to illustrate only some of many feasible ways used for implementing the method, the apparatus, and/or the system described herein, and the many feasible ways will be apparent after the disclosure of the present application is understood.

As used herein, terms "and/or" include any one or two or more combinations of associated listed items.

A term used herein is only used for describing various examples and is not used for limiting the disclosure. Unless otherwise clearly indicated by the context, a singular form is intended to include a plural form. Terms "comprising", "including", and "having" show the presence of stated features, amounts, operations, components, elements, and/or combinations thereof, but do not preclude the presence or addition of one or more other features, amounts, operations, components, elements, and/or combinations thereof.

Unless otherwise defined, all terms (including technical and scientific terms) used herein have the same meaning as commonly understood by a person skilled in the art to which this disclosure belongs after the person understands the present disclosure. Unless otherwise expressly defined herein, terms (such as those defined in commonly used dictionaries) should be construed as having a meaning that is consistent with their meaning in the context of the related art and the present disclosure, and will not be construed in an idealized or overly formal sense.

Further, in the description of the examples, detailed descriptions of well-known related structures or functions will be omitted when it is considered that such detailed descriptions would obscure the disclosure.

Reference will now be made to the embodiments of the present disclosure in detail, and examples of the embodiments are shown in the drawings, in which like reference numbers always refer to like components. In order to explain the present disclosure, the embodiments are described below with reference to the drawings.

Figure 1:
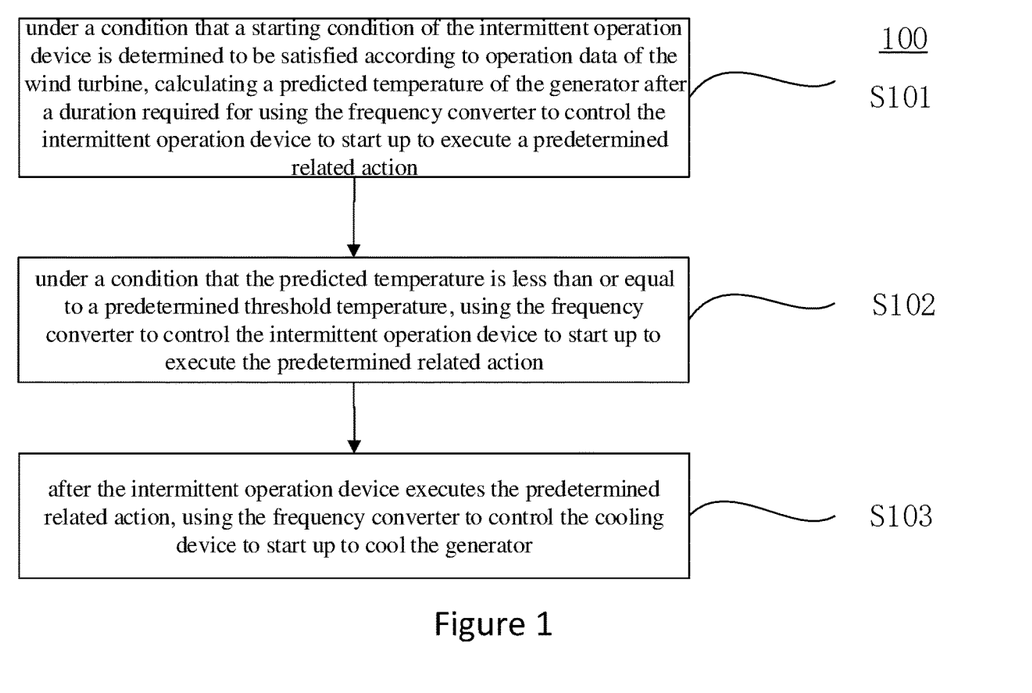
FIG. 1 is a flowchart showing a cooling control method for a generator of a wind turbine according to embodiments of the present disclosure.

FIG. 1 is a flowchart showing a cooling control method 100 for a generator of a wind turbine according to embodiments of the present disclosure. According to the embodiments of the present disclosure, a cooling device of the generator and an intermittent operation device of the wind turbine are connected to a same frequency converter, the frequency converter controls the cooling device and the intermittent operation device to start up at different times.

With reference to FIG. 1, in step S101, under a condition that a starting condition of the intermittent operation device is determined to be satisfied according to operation data of the wind turbine, a predicted temperature of the generator is calculated after a duration required for using the frequency converter to control the intermittent operation device to start up to execute a predetermined related action.

In step S102, under a condition that the predicted temperature is less than or equal to a predetermined threshold temperature, the frequency converter is used to control the intermittent operation device to start up to execute the predetermined related action.

According to the embodiments of the present disclosure, before using the frequency converter to control the intermittent operation device to start up, the cooling control method further includes: based on a first opening, using the frequency converter to control the cooling device to start up to cool the generator.

According to the embodiments of the present disclosure, openings mentioned in the present disclosure (for example, the first opening as described above and a second opening described later) are percentages of a rated output power of the frequency converter. In some embodiments, the value of the first opening is greater than 0 and less than 1.

In step S103, after the intermittent operation device executes the predetermined related action, the frequency converter is used to control the cooling device to start up to cool the generator.

According to the embodiments of the present disclosure, the step of using the frequency converter to control the cooling device to start up to cool the generator at step S103 may include: after the intermittent operation device executes the predetermined related action, based on a second opening, using the frequency converter to control the cooling device to start up to cool the generator.

As an example, the value of the second opening is greater than 0 and less than 1.1.

In some embodiments, the first opening is less than the second opening.

In some embodiments, after the step of based on the second opening, using the frequency converter to control the cooling device to start up to cool the generator, the cooling control method may further include the following step: under a condition that a temperature of the wind turbine reaches a static heat balance temperature, based on the first opening, using the frequency converter to control the cooling device to start up to cool the generator.

According to the embodiments of the present disclosure, in some embodiments, the cooling control method 100 for the generator may further include the following step: under a condition that the predicted temperature is greater than the predetermined threshold temperature, controlling the wind turbine to reduce an output power, and then executing a step of determining, according to the operation data of the wind turbine, whether the starting condition of the intermittent operation device is satisfied.

According to the embodiments of the present disclosure, the intermittent operation device may be a yaw motor of the wind turbine. Under this condition, the calculation formula for the predicted temperature may be the following formula (1):

$$T_2 = T_1 + \frac{\beta_1 \times P_f \times S_1 \times \theta_1}{C_1} \quad (1)$$

Herein, $T_2$ represents the predicted temperature, $T_1$ represents the static heat balance temperature, $\beta_1$ represents the first opening, $P_f$ represents a heat dissipation power of the generator under a condition that the first opening value is 1, $S_1$ represents a yaw speed, $\theta_1$ represents an angle relative to the wind, and $C_1$ represents a heat capacity of the generator.

According to the embodiments of the present disclosure, the calculation formula for an interval time length $\Delta t$ required for, based on the second opening, using the frequency converter to control the cooling device to start up to cool the generator may be the following formula (2):

$$\Delta t = \frac{T_2 - T_1}{\beta_2 - \beta_1} \times \frac{C_1}{P_f} \quad (2)$$

Herein, $\beta_2$ represents the second opening.

Figure 2:
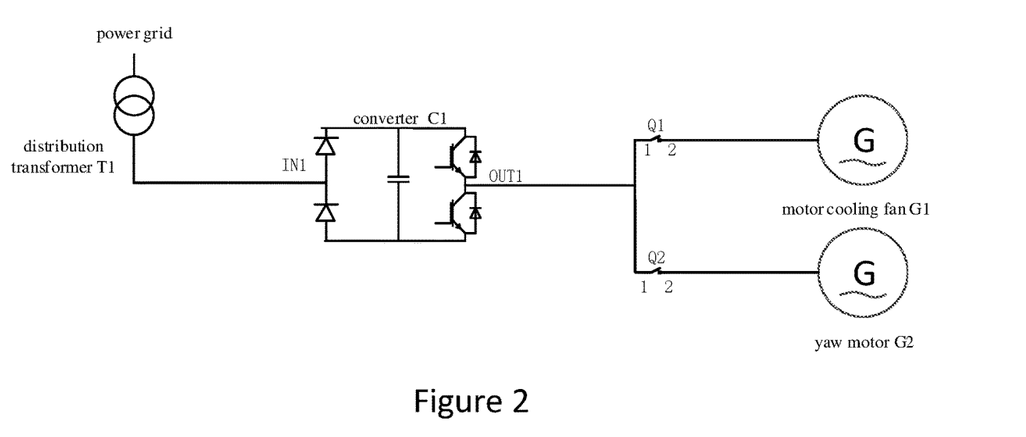
FIG. 2 is a schematic view of an example system structure for implementing a cooling control method for a generator of a wind turbine according to embodiments of the present disclosure.
Figure 3:
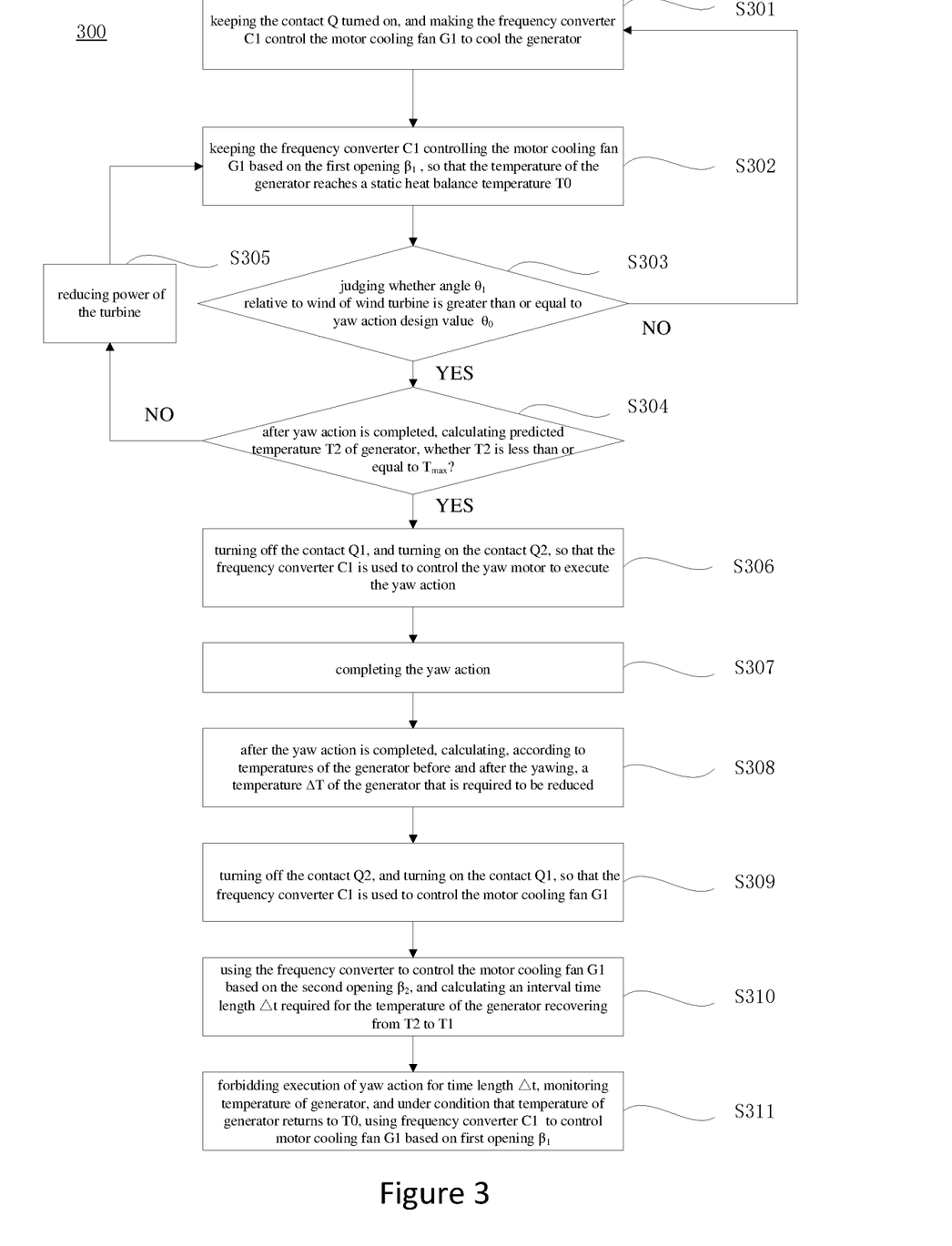
FIG. 3 is a flowchart showing an example for implementing a cooling control method for a generator of a wind turbine according to embodiments of the present disclosure.

The system structure and the flowchart for implementing the cooling control method 100 for the generator are described in detail below with reference to FIG. 2 and FIG. 3. FIG. 2 is a schematic view 200 of an example system structure for implementing a cooling control method for a generator of a wind turbine according to embodiments of the present disclosure, and FIG. 3 is a flowchart 300 showing an example for implementing a cooling control method for a generator of a wind turbine according to embodiments of the present disclosure. As an example, in the example, the cooling device of the generator is a motor cooling fan, and the intermittent operation device is a yaw motor.

With reference to FIG. 2, the example system structure for implementing the cooling control method for the generator of the wind turbine according to embodiments of the present disclosure includes a distribution transformer T1, a frequency converter C1, a motor cooling fan G1, and a yaw motor G2.

In some embodiments, one terminal of the distribution transformer is connected to the power grid (for example, external high voltage power grid) and the other terminal is connected to the frequency converter. An input terminal IN1 of the frequency converter is connected to the distribution transformer, and an output terminal OUT1 is connected to a contact Q1 (for example, to the pin 1 of contact Q1) and a contact Q2 (for example, to the pin 1 of contact Q2). The motor cooling fan is connected to the frequency converter via the contact Q1 (for example, a pin 2 of contact Q1). The yaw motor is connected to the frequency converter via the contact Q2 (for example, the pin 2 of contact Q2). The contacts Q1 and Q2 are turned on at different times.

With reference to FIG. 3, in step S301, the contact Q1 keeps being turned on, and the frequency converter C1 controls the motor cooling fan G1 to cool the generator. Under this condition, the wind turbine is in a normal operation state.

In step S302, the frequency converter C1 keeps controlling the motor cooling fan G1 based on the first opening $\beta_1$, so that the temperature of the generator reaches a static heat balance temperature T0.

In step S303, it is judged whether an angle $\theta_1$ relative to the wind of the wind turbine (simply referred to as the turbine below) is greater than or equal to a yaw action design value $\theta_0$. Under a condition that the value of $\theta_1$ is greater than or equal to the yaw action design value $\theta_0$, it is determined that a yaw action (for example, yawing relative to the wind) may be required to be executed, and under a condition that the value of $\theta_1$ is not greater than or equal to the yaw action design value $\theta_0$, return to step S301 to keep the turbine in the normal operation state.

In step S304, a predicted temperature T2 of the generator after the yaw action is completed may be calculated according to the formula (1), and the T2 is compared with a maximum allowable temperature $T_{max}$ of the generator.

Under a condition that the T2 is greater than the $T_{max}$, the power of the turbine is reduced in step S305, and then return to execute step S302.

Under a condition that the T2 is less than or equal to the $T_{max}$, the yaw action is executed, and in step S306, the contact Q1 is turned off, and the contact Q2 is turned on, so that the frequency converter C1 is used to control the yaw motor to execute the yaw action.

In step S307, the frequency converter C1 drives the yaw motor according to parameters of the yaw motor and a specified yaw rate S1, and finally the yaw action is completed.

In step S308, after the yaw action is completed, a temperature $\Delta T$ of the generator (that is, T2−T0) that is required to be reduced is calculated according to temperatures of the generator before and after the yawing.

In step S309, the contact Q2 is turned off, and the contact Q1 is turned on, so that the frequency converter C1 is used to control the motor cooling fan G1.

In step S310, the frequency converter is used to control the motor cooling fan G1 based on the second opening $\beta_2$, and an interval time length $\Delta t$ required for the temperature of the generator recovering from T2 to T1 is calculated (according to the formula (2)).

In step S311, execution of the yaw action is prohibited for the time length $\Delta t$, the temperature of the generator is monitored, and under a condition that the temperature of the generator returns to T0, the frequency converter C1 is used to control the motor cooling fan G1 based on the first opening $\beta_1$. Under this condition, the wind turbine returns to the normal operation state.

It should be noted that the implementations of the present application are merely examples, and the present application is not limited thereto.

In some embodiments, the cooling device according to the embodiments of the present disclosure may include a heat dissipation device capable of achieving various cooling methods, such as an air-to-air cooling heat dissipation device (including a fan), an air-to-water cooling heat dissipation device (including a fan and a water pump), a water-to-air cooling heat dissipation device (including a fan and a water pump), and the like.

By using the cooling control method for the generator according to the present disclosure, a control evaluation in a dynamic heat balance state is achieved in addition to the conventional control evaluation in the static heat balance state. By using the same frequency converter to jointly control the cooling device of the generator and the intermittent operation device (e.g., the yaw motor), such beneficial effects are achieved that in the solution the distribution transformer has a small capacity, the starting shock is small, the self-power consumption is low, the generator has a small temperature fluctuation, and no yaw trip exists, while a relatively low cost is ensured.

Figure 4:
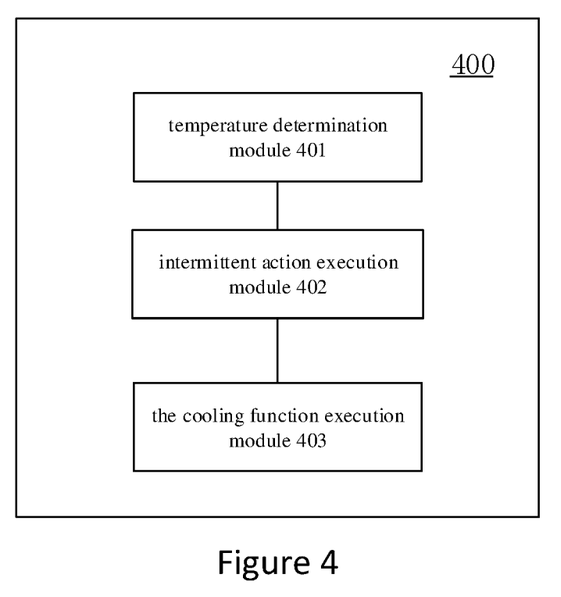
FIG. 4 is a block diagram showing a cooling control apparatus for a generator of a wind turbine according to embodiments of the present disclosure.

FIG. 4 is a block diagram showing a cooling control apparatus 400 for a generator of a wind turbine according to embodiments of the present disclosure. According to the embodiments of the present disclosure, a cooling device of the generator and an intermittent operation device of the wind turbine are connected to a same frequency converter, the frequency converter controls the cooling device and the intermittent operation device to start up at different times.

With reference to FIG. 4, the cooling control apparatus 400 for the generator of the wind turbine according to the embodiments of the present disclosure includes a temperature determination module 401, an intermittent action execution module 402, and a cooling function execution module 403.

According to the embodiments of the present disclosure, the temperature determination module 401 is configured to calculate, under a condition that a starting condition of the intermittent operation device is determined to be satisfied according to operation data of the wind turbine, a predicted temperature of the generator after a duration required for using the frequency converter to control the intermittent operation device to start up to execute a predetermined related action.

According to the embodiments of the present disclosure, the intermittent action execution module 402 is configured to use, under a condition that the predicted temperature is less than or equal to a predetermined threshold temperature, the frequency converter to control the intermittent operation device to start up to execute the predetermined related action. In some embodiments, before the intermittent action execution module 402 executes the step of using the frequency converter to control the intermittent operation device to start up, the cooling function execution module 403 may further execute the following operation: based on the first opening, using the frequency converter to control the cooling device to start up to cool the generator.

According to the embodiments of the present disclosure, the cooling function execution module 403 is configured to use, after the intermittent operation device executes the predetermined related action, the frequency converter to control the cooling device to start up so as to cool the generator. In some embodiments, the operation of the cooling function execution module 403 using, after the intermittent operation device executes the predetermined related action, the frequency converter to control the cooling device to start to cool the generator may include: after the intermittent operation device executes the predetermined related action, based on the second opening, using the frequency converter to control the cooling device to start up to cool the generator.

It should be understood that the specific description about the first opening and the second opening has been set forth above with reference to FIG. 1, and will not be described here again in order to avoid repetition.

According to the embodiment of the present disclosure, in some embodiments, after the operation of the cooling function execution module 403, based on the second opening, using the frequency converter to control the cooling device to start up to cool the generator, the following operation may further be executed: under a condition that a temperature of the wind turbine reaches a static heat balance temperature, based on the first opening, using the frequency converter to control the cooling device to start up to cool the generator.

According to the embodiments of the present disclosure, the cooling control apparatus 400 for the generator may further include a power control module (not shown). The power control module is configured to, under a condition that the predicted temperature is greater than the predetermined threshold temperature, control the wind turbine to reduce an output power, and then execute a step of determining, according to the operation data of the wind turbine, whether the starting condition of the intermittent operation device is satisfied.

According to the embodiments of the present disclosure, the intermittent operation device may be the yaw motor of the wind turbine. It should be understood that the predicted temperature under this condition and the calculation formula for the interval time length $\Delta t$ required for, based on the second opening, using the frequency converter to control the cooling device to start up to cool the generator have been set forth with reference to FIG. 1, and will not be repeated here.

In some embodiments, the cooling control apparatus for the generator according to the embodiments of the present disclosure may be arranged in a main controller of the wind turbine.

Figure 5:
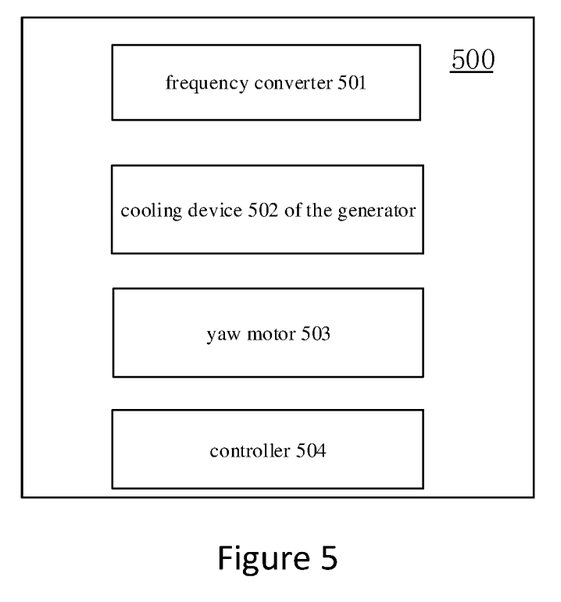
FIG. 5 is a block diagram showing a wind turbine according to embodiments of the present disclosure.

FIG. 5 is a block diagram showing a wind turbine 500 according to embodiments of the present disclosure.

With reference to FIG. 5, the wind turbine 500 according to the embodiments of the present disclosure includes a frequency converter 501, a cooling device 502 of the generator, a yaw motor 503, and a controller 504. According to the embodiments of the present disclosure, the cooling device 502 and the yaw motor 503 are connected to the same frequency converter 501, and the frequency converter 501 controls the cooling device 502 and the yaw motor 503 to start up at different times.

In some embodiments, the controller 504 according to the embodiments of the present disclosure may be the cooling control apparatus for the generator as described above (for example, the cooling control apparatus 400 for the generator) or a calculation apparatus as will be described with reference to FIG. 6 (for example, a calculation apparatus 600).

In some embodiments, the controller 504 is configured to execute the following operations: under a condition that a starting condition of the yaw motor 503 is determined to be satisfied according to operation data of the wind turbine 500, calculating the predicted temperature of the generator after a duration required for using the frequency converter 501 to control the yaw motor 503 to start up to execute a yaw action; under a condition that the predicted temperature is less than or equal to the predetermined threshold temperature, using the frequency converter 501 to control the yaw motor to start up to execute the yaw action; and after the yaw motor 503 executes the yaw action, using the frequency converter 501 to control the cooling device 502 to start up to cool the generator.

It should be understood that the controller 504 may also execute various steps and operations as set forth in FIG. 1, and will not be described here again in order to avoid repetition.

Figure 6:
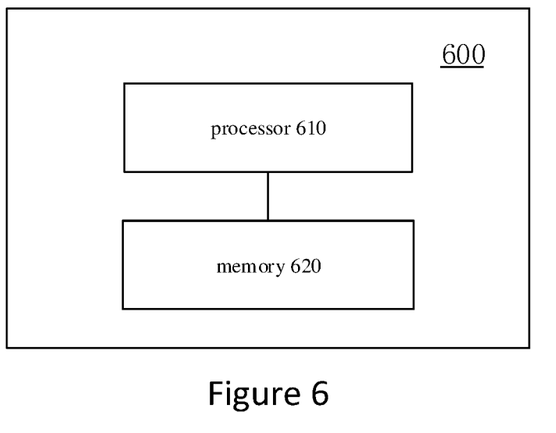
FIG. 6 is a block diagram showing a calculation apparatus according to embodiments of the present disclosure.

FIG. 6 is a block diagram showing a calculation apparatus according to embodiments of the present disclosure.

With reference to FIG. 6, the calculation apparatus 600 according to the embodiments of the present disclosure may include a processor 610 and a memory 620. The processor 610 may include, but is not limited to, a central processing unit (CPU), a digital signal processor (DSP), a microcomputer, a field programmable gate array (FPGA), a system-on-chip (SoC), a microprocessor, an application specific integrated circuit (ASIC), and the like. The memory 620 may store a computer program to be executed by the processor 610. The memory 620 includes a high speed random access memory and/or a non-volatile computer readable storage medium. The computer program stored in the memory 620, when executed by the processor 610, may implement the cooling control method for the generator as described above. The calculation apparatus 600 according to the embodiments of the present disclosure may be arranged in a main controller of the wind turbine.

The cooling control method for the generator according to the embodiments of the present disclosure may be written as a computer program and stored on a computer readable storage medium. The computer program, when executed by a processor, may implement the cooling control method for the generator as described above. Examples of the computer readable storage media include: a read only memory (ROM), a random access programmable read only memory (PROM), an electrically erasable programmable read only memory (EEPROM), a random access memory (RAM), a dynamic random access memory (DRAM), a static random access memory (SRAM), a flash memory, a non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, a blu-ray or optical disk memory, a hard disk drive (HDD), a solid state hard disk (SSD), a card memory (such as a multi-media card, a secure digital (SD) card or a high speed digital (XD) card), a magnetic tape, a floppy disk, a magneto-optical data storage, an optical data storage, a hard disk, a solid state disk and any other apparatus, and the any other apparatus is configured to store a computer program and any associated data, data file and data structure in a non-transitory manner and provide the computer program and the any associated data, data file and data structure to a processor or a computer, so that the processor or the computer can execute the computer program. In one example, the computer program and the any associated data, data file and data structure are distributed over networked computer systems, so that the computer program and the any associated data, data file and data structure are stored, accessed and executed in a distributed manner by one or more processors or computers.

By using the same frequency converter to jointly control the cooling device of the generator and the yaw motor, the cooling control method and the cooling control apparatus for the generator of the wind turbine according to the exemplary embodiments of the present disclosure achieve such beneficial effects that in the solution the distribution transformer has a small capacity, the starting shock is small, the self-power consumption is low, the generator has a small temperature fluctuation, and no yaw trip exists, while a relatively low cost is ensured.

Although some of the exemplary embodiments of the present disclosure have been illustrated and described, those skilled in the art should understand that modifications and variations may be made to these embodiments without departing from the scope of the principle and the gist of the present disclosure defined by the claims and their equivalents.

The invention claimed is:

1. A cooling control method for a generator of a wind turbine, comprising:
   when a starting condition of an intermittent operation device of the wind turbine is determined to be satisfied according to operation data of the wind turbine, calculating a predicted temperature of the generator after a duration required for using a frequency converter of the wind turbine to control the intermittent operation device to start up to execute a predetermined related action;
   when the predicted temperature is less than or equal to a predetermined threshold temperature, using the frequency converter to control the intermittent operation device to start up to execute the predetermined related action; and
   after the intermittent operation device executes the predetermined related action, using the frequency converter to control the cooling device to start up to cool the generator.

2. The cooling control method according to claim 1, wherein before using the frequency converter to control the intermittent operation device to start up, the cooling control method further comprises:
   based on a first opening, using the frequency converter to control the cooling device to start up to cool the generator; and
   the step of after the intermittent operation device executes the predetermined related action, using the frequency converter to control the cooling device to start up to cool the generator comprises:
   after the intermittent operation device executes the predetermined related action, based on a second opening, using the frequency converter to control the cooling device to start up to cool the generator,
   wherein the first opening and the second opening are percentages of a rated output power of the frequency converter, and the first opening is less than the second opening.

3. The cooling control method according to claim 2, wherein after the step of based on the second opening, using the frequency converter to control the cooling device to start up to cool the generator, the cooling control method further comprises:
   when a temperature of the wind turbine reaches a static heat balance temperature, based on the first opening, using the frequency converter to control the cooling device to start up to cool the generator.

4. The cooling control method according to claim 1, further comprising:
   when the predicted temperature is greater than the predetermined threshold temperature, controlling the wind turbine to reduce an output power, and then executing a step of determining, according to the operation data of the wind turbine, whether the starting condition of the intermittent operation device is satisfied.

5. The cooling control method according to claim 4, wherein the intermittent operation device is a yaw motor of the wind turbine.

6. A calculation apparatus, comprising:
   a processor; and
   a memory storing a computer program, wherein the computer program, when executed by a processor, implements a cooling control method for a generator of a wind turbine, the cooling control method comprising:
   when a starting condition of an intermittent operation device of the wind turbine is determined to be satisfied according to operation data of the wind turbine, calculating a predicted temperature of the generator after a duration required for using a frequency converter of the wind turbine to control the intermittent operation device to start up to execute a predetermined related action;
   when the predicted temperature is less than or equal to a predetermined threshold temperature, using the frequency converter to control the intermittent operation device to start up to execute the predetermined related action; and after the intermittent operation device executes the predetermined related action, using the frequency converter to control the cooling device to start up to cool the generator.

7. The calculation apparatus according to claim 6, wherein the calculation apparatus is arranged in a main controller of the wind turbine.

8. A wind turbine, comprising:

a frequency converter;

a cooling device of a generator;

a yaw motor; and a calculation apparatus, comprising:

a processor; and a memory storing a computer program, wherein the computer program, when executed by a processor, implements a cooling control method for the generator of the wind turbine, the cooling control method comprising:

when a starting condition of the yaw motor is determined to be satisfied according to operation data of the wind turbine, calculating a predicted temperature of the generator after a duration required for using the frequency converter to control the intermittent operation device to start up to execute a predetermined related action;

when the predicted temperature is less than or equal to a predetermined threshold temperature, using the frequency converter to control the intermittent operation device to start up to execute the predetermined related action; and after the intermittent operation device executes the predetermined related action, using the frequency converter to control the cooling device to start up to cool the generator.

9. The cooling control method according to claim 4, wherein before using the frequency converter to control the intermittent operation device to start up, the cooling control method further comprises:

based on a first opening, using the frequency converter to control the cooling device to start up to cool the generator; and the step of after the intermittent operation device executes the predetermined related action, using the frequency converter to control the cooling device to start up to cool the generator comprises:

after the intermittent operation device executes the predetermined related action, based on a second opening, using the frequency converter to control the cooling device to start up to cool the generator, wherein the first opening and the second opening are percentages of a rated output power of the frequency converter, and the first opening is less than the second opening.

10. The cooling control method according to claim 9, wherein after the step of based on the second opening, using the frequency converter to control the cooling device to start up to cool the generator, the cooling control method further comprises:

when a temperature of the wind turbine reaches a static heat balance temperature, based on the first opening, using the frequency converter to control the cooling device to start up to cool the generator.

* * * * *